Figure 1:
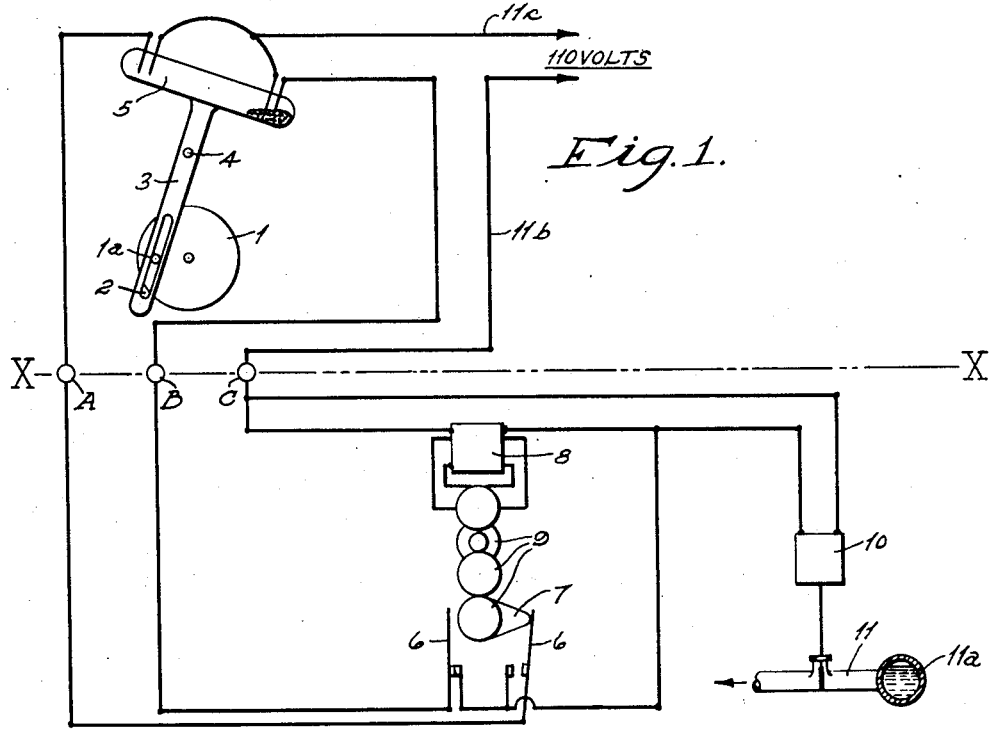

Feb. 8, 1949.  G. C. FAIRBAIRN  2,461,045
AUTOMATIC SAMPLING DEVICE
Filed Sept. 13, 1947  2 Sheets-Sheet 1

INVENTOR.
GEORGE C. FAIRBAIRN
BY Daniel Stryker
J. H. Grahame
ATTORNEYS

Feb. 8, 1949.    G. C. FAIRBAIRN    2,461,045
AUTOMATIC SAMPLING DEVICE
Filed Sept. 13, 1947    2 Sheets-Sheet 2

INVENTOR.
GEORGE C. FAIRBAIRN
BY Daniel Stryker
J. H. Grahame
ATTORNEYS

UNITED STATES PATENT OFFICE 2,461,045

AUTOMATIC SAMPLING DEVICE

George C. Fairbairn, Port Arthur, Tex., assignor to The Texas Company, New York, N. Y., a corporation of Delaware Application September 13, 1947, Serial No. 773,878

7 Claims. (Cl. 73—422)

The invention concerns an automatic sampling device for use in obtaining samples of fluids moving through a pipe line.

It is an object of the invention to provide means for obtaining samples which are representatives of gases or liquids passing through a pipe line during a given time interval.

It is a further object of the invention to provide an automatic sampling device adapted to take samples intermittently at time intervals corresponding to the rate of flow through the pipe line, each of the samples being of predetermined volume.

It is customary to measure the rate of flow through a pipe line by means of flow meters of either the displacement type or the differential type. The device of the invention includes a flow meter of the displacement type. In a copending application, Serial No. 773,879, filed Sept. 13, 1947, I have disclosed and claimed an automatic sampling device which includes a differential type meter.

The device of the invention includes a sample draw-off line connected to the pipe line, a shutoff valve in the sample draw-off line, and valve operating means adapted to open and close the shutoff valve. A displacement type flow meter installed in the pipe line is responsive to fluctuations in rate of flow through the pipe line. A primary timing mechanism actuated by the flow meter is adapted to complete first one and then the other of a pair of electrical circuits at time intervals corresponding to the rate of flow through the pipe line. A secondary timing mechanism actuated by a constant speed electric motor is adapted to complete first one and then the other of the electrical circuits and to break the circuits after a predetermined period of time has elapsed. The valve operating means and the secondary timing mechanism are actuated by first one and then the other of the electrical circuits.

In displacement type meters the speed of rotation of the meter shaft is proportioned to the rate of flow. In the device of the invention the primary timing mechanism, which is actuated by the flow meter, comprises a double throw mercury switch mounted on a slotted lever and an eccentric mounted directly on the meter shaft adapted to engage the slotted lever and tilt the mercury switch. If desired the eccentric may be driven by the meter shaft through speed reducing gears.

The valve operating means which opens and closes the shutoff valve may comprise either a solenoid or a constant speed electric motor equipped with speed reducing gears.

The secondary timing mechanism, which is actuated by a constant speed electric motor, may comprise a pair of switches adapted to be opened and closed alternately by an eccentric driven by the constant speed motor through speed reducing gears. In one form of the invention the secondary timing mechanism comprises a double throw mercury switch mounted on a slotted lever and an eccentric driven by the constant speed motor through speed reducing gears adapted to engage the slotted lever and tilt the mercury switch. When the valve operating means comprises a constant speed motor and speed reducing gears the secondary timing mechanism may be actuated by the valve operating means, the eccentric which constitutes a part of the timing mechanism being mounted directly on the valve stem and actuating a reciprocating rod which in turn acts upon a lever on which a double throw mercury switch is mounted, to tilt the mercury switch.

The invention will be better understood from the following description and the accompanying drawing, in which:

Fig. 1 is a diagrammatic view in elevation of one form of the invention in which the valve operating means comprises a solenoid, the eccentric constituting a part of the primary timing mechanism being mounted directly on the meter shaft and the secondary timing mechanism comprising a pair of switches adapted to be opened and closed alternately by an eccentric driven by a constant speed motor through speed reducing gears.

Figure 2:
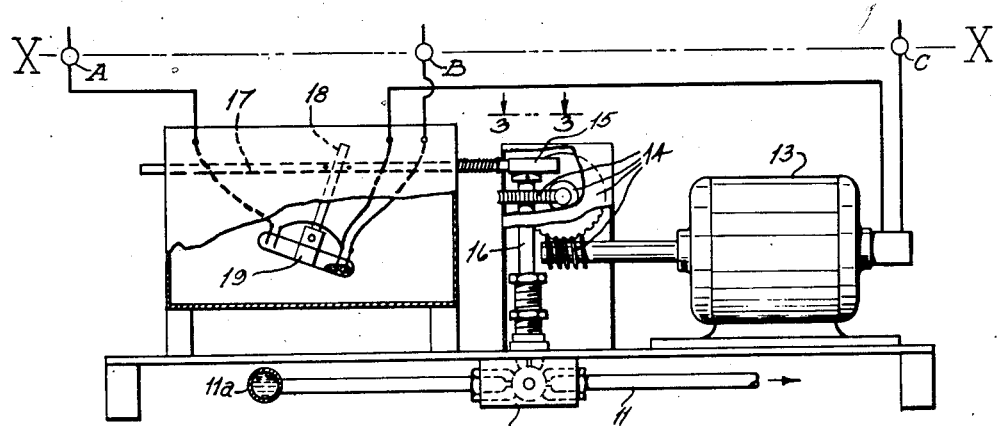

Fig. 2 is a diagrammatic view in elevation of a modified form of the invention in which the valve operating means comprises a constant speed electric motor and speed reducing gears, the secondary timing mechanism being actuated by the valve operating means. The apparatus shown in Fig. 2 may be substituted for the portion of the apparatus shown below the dotted line X—X of Fig. 1, the points A, B and C being common to both views.

Figure 3:
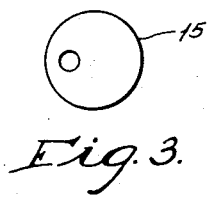

Fig. 3 is an enlarged plan view taken on the line 3—3 of Fig. 2 showing the eccentric which constitutes a portion of the secondary timing mechanism.

Figure 4:
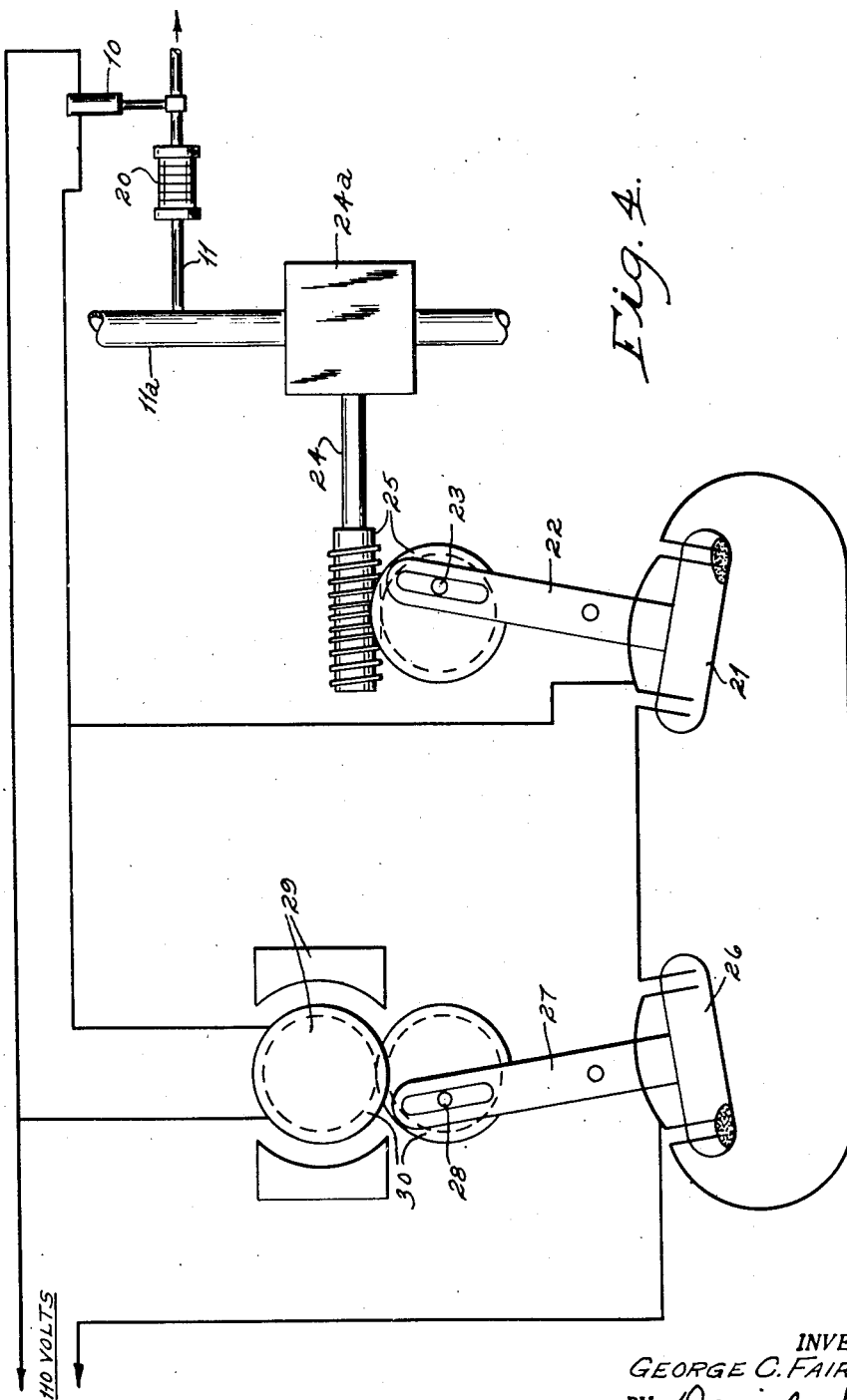

Fig. 4 is a diagrammatic view in elevation of another form of the invention in which the valve operating means comprises a solenoid, the eccentric constituting a part of the primary timing mechanism being driven by the meter shaft through speed reducing gears and the secondary timing mechanism comprising a double throw mercury switch mounted on a slotted lever with an eccentric driven by a constant speed motor through speed reducing gears adapted to engage the slotted lever and tilt the mercury switch.

Referring to Fig. 1 of the drawing, an eccentric 1 is mounted directly on the shaft of a displacement type meter. A pin 1a on the eccentric 1 is adapted to engage a slot 2 in one end of a lever 3. The lever 3 is pivoted at 4, and a double throw mercury switch 5 is mounted on the upper end of the lever 3. The arrangement is such that the lever 3 is rocked back and forth by the action of the eccentric 1, the mercury switch 5 being tilted and its position reversed upon completion of each one-half revolution of the meter shaft. The foregoing arrangement is referred to as a primary timing mechanism, and is equivalent to the primary timing mechanism shown in Fig. 4 which will be described hereinafter.

A pair of switches 6 spring biased to their closed position are adapted to be opened by the action of an eccentric 7, the eccentric being actuated by a small constant speed electric motor 8 and speed reducing gears 9. The arrangement is such that one of the switches 6 is opened and the other is closed upon completion of each one-half revolution of the eccentric 7. This arrangement is referred to as a secondary timing mechanism and is equivalent to the secondary timing mechanism shown in Figs. 2 and 4.

A solenoid operated valve shown diagrammatically at 10 is installed in a sample draw-off line 11 leading from the pipe line 11a to be sampled. The flow meter, not shown, is installed in the pipe line 11a and is responsive to fluctuations in flow rate through the pipe line. A second valve or one or more orifices, neither of which is shown, may be installed in the sample draw-off line 11 to regulate the size of the stream passing therethrough.

Lead wires 11b and 11c are provided to connect the solenoid operated valve 10 and the constant speed motor 8 to a source of electricity. One of the lead wires 11b is connected directly to the valve 10 and the motor 8, the other wire 11c being connected to the valve 10 and the motor 8 through the double throw mercury switch 5 and the two switches 6. Each of the switches 6 is connected in series with one of the two pairs of contact points of the double throw mercury switch 5.

As shown in the drawing, a circuit has just been completed through the right hand pair of contact points of the mercury switch 5 permitting current to flow through the left hand switch 6, which is closed. This opens the solenoid valve 10 and also starts the constant speed motor 8, which in turn actuates the eccentric 7 through the speed reducing gears 9. The valve 10 remains open and the motor 8 continues to run for a predetermined period of time, the circuit being eventually broken by the action of the eccentric 7 which opens the left hand switch 6 and closes the other. The solenoid valve will then close. Thereafter no current flows to the solenoid valve 10 and the motor 8 until the mercury switch 5 is tilted to reverse position and a second circuit is completed through the left hand pair of contact points of the mercury switch 5 and the right hand switch 6.

Referring to Figs. 2 and 3 of the drawing, a ball type shutoff valve 12 is installed in the sample draw-off line 11, the shutoff valve 12 being rotated by a constant speed electric motor 13 through speed reducing gears 14. The secondary timing mechanism comprises an eccentric 15 mounted on the stem 16 of the shutoff valve 12 which actuates a reciprocating rod 17, the reciprocating rod 17 in turn acting upon a lever 18 on which a double throw mercury switch 19 is mounted, to tilt the mercury switch 19. As stated hereinbefore, the apparatus of Fig. 2 may be substituted for the apparatus shown below the dotted line X—X of Fig. 1, the points A, B and C being common to both views.

When the apparatus of Figure 2 is used instead of that shown below the dotted line in Fig. 1 the operation is similar to that previously described. Thus, with the switch 5 in the position shown in Fig. 1 and the switch 19 in the position shown in Fig. 2 a circuit will be completed through the motor 13 which will cause this motor to turn the valve 12 to permit a sample to pass through the sampling line 11. At the same time the eccentric 15 on the valve shaft will be pushing the rod 17 to tilt the switch 19 in the opposite direction to break the circuit. When the circuit is thus broken by the switch 19 the valve 12 will have been turned past its open position to its closed position, preventing further sample withdrawal through the sample line 11. When the eccentric 1 on the meter shaft is turned sufficiently the switch 5 will tilt in the opposite direction and the circuit will again be completed through the switch 19 to the motor 13. The motor 13 will again turn the valve 12 to permit another sample to be drawn through the line 11 while shortly thereafter the switch 19 will be tilted again to the position shown in Figure 2, breaking the circuit to the motor 13. This cycle is repeated for each revolution of the eccentric 1 on the meter shaft.

Referring to Fig. 4 of the drawing, a solenoid operated valve 10 is installed in the sample draw-off line 11. A number of orifices 20 may be positioned in the sample draw-off line to regulate the size of the stream moving through the sample draw-off line 11. The primary timing mechanism comprises a double throw mercury switch 21 mounted on a slotted lever 22, and an eccentric 23 driven by the shaft 24 of the meter 24a through speed reducing gears 25 is adapted to engage the slotted lever 22 and tilt the mercury switch 21. The secondary timing mechanism comprises a double throw mercury switch 26 mounted on a slotted lever 27 and an eccentric 28 driven by a constant speed motor 29 through speed reducing gears 30 adapted to engage the slotted lever 27 and tilt the mercury switch 26.

In operation, the apparatus shown in Fig. 4 functions in substantially the same manner as that shown in Figure 1, the main difference residing in the type of switch used in the secondary timing mechanism. Thus, the shaft 24 of the meter 24a in driving the gear 25 causes the switch 21 to tilt intermittently, first in one direction and then in the other. When in the position shown in Fig. 4 the electrical circuit is completed through the left hand side of the switch 26 and the right hand side of the switch 21 so that the solenoid valve 10 is actuated to permit a sample to be drawn through the line 11. At the same time the motor 29 is actuated with the result that, after a predetermined interval, the switch 26 will be tilted to open the circuit. The valve 10 will then close and the motor 29 will stop until the switch 21 is tilted in the opposite direction. The circuit will then again be closed through the left hand side of the switch 21 and the right hand side of the switch 26 to again actuate the valve 10 and the motor 29 to allow another sample to be drawn through the line 11. This operation is continued, the frequency of the reversals of the switches 21 and 26 depending upon the rate of flow through the pipe line 11a and the meter 24a.

Obviously many modifications and variations of the invention, as hereinbefore set forth, may be made without departing from the spirit and scope thereof, and therefore only such limitations should be imposed as are indicated in the appended claims.

I claim:

1. An automatic sampling device for use in obtaining samples of a fluid flowing through a pipe line at intervals the frequency of which vary in accordance with the flow rate through said pipe line, comprising a sample draw-off line connected to said pipe line, a valve in said draw-off line, electrical actuating means for said valve, a device responsive to the flow through said pipe line, a source of electricity, a pair of electrical circuits connected to said valve actuating means, a primary timing device actuated by said flow responsive device for connecting said source alternately first to one and then to the other of said circuits and a secondary timing device for opening the closed circuits at predetermined intervals after they are closed by said primary timing device.

2. An automatic sampling device for use in obtaining samples of a fluid flowing through a pipe line at intervals the frequency of which vary in accordance with the flow rate through said pipe line, comprising a sample draw-off line connected to said pipe line, a valve in said draw-off line, electrical actuating means for said valve, a flow meter responsive to the flow through said pipe line, a source of electricity, a pair of electrical circuits connected to said valve actuating means, a primary timing device actuated by said flow meter for connecting said source alternately first to one and then to the other of said circuits and a secondary timing device operated by said valve actuating device for opening the closed circuits at predetermined intervals after they are closed by said primary timing device.

3. An automatic sampling device for use in obtaining samples of uniform volume of a fluid flowing through a pipe line at intervals the frequency of which vary in accordance with the flow rate through said pipe line, comprising a sample draw-off line connected to said pipe line, a valve in said draw-off line, electrical actuating means for said valve, an electric circuit including a source of electricity and said valve actuating means, a primary timing device connected in said circuit, means for driving said primary timing device to close said circuit to energize said valve actuating means at intermittent intervals in accordance with the rate of flow through said pipe line, a secondary timing device connected in said circuit, and means for actuating said secondary timing device to open said circuit at predetermined intervals after the circuit has been closed by the primary timing device.

4. An automatic sampling device for use in obtaining samples of a fluid flowing through a pipe line at intervals the frequency of which vary in accordance with the flow rate through said pipe line, comprising a sample draw-off line connected to said pipe line, a valve in said draw-off line, electrical actuating means for said valve, a device responsive to the flow through said pipe line, a source of electricity, a pair of electrical circuits connected to said valve actuating means, a primary timing device actuated by said flow responsive device for connecting said source alternately first to one and then to the other of said circuits, a secondary timing device for opening the closed circuits at predetermined intervals after they are closed by said primary timing device, means for actuating said secondary timing device comprising an electric motor connected in circuit with and energized concurrently with said valve actuating means and reduction gearing connecting said motor and said secondary timing device.

5. An automatic sampling device for use in obtaining equal-sized samples of a fluid flowing through a pipe line intermittently in accordance with the rate of flow of said fluid through the pipe line, comprising a device responsive to said rate of flow, a sample draw-off line connected to said pipe line, a valve in said draw-off line normally biased to its closed position, actuating means for opening said valve, an electric circuit including a source of electricity and said valve actuating means, means for intermittently closing and opening said circuit to open and close said valve respectively, comprising a primary switching device and a secondary switching device in said circuit, said primary switching device being actuated by said flow responsive device and said secondary switching device being energized by the current flowing through said circuit to open the circuit a predetermined time interval after the circuit is closed by said primary switching device.

6. An automatic sampling device for use in obtaining samples of a fluid flowing through a pipe line at intervals the frequency of which vary in accordance with the flow rate through said pipe line comprising a sample draw-off line connected to said pipe line, a valve in said draw-off line, electrical actuating means for said valve, a flow meter responsive to the flow through said pipe line, a source of electricity, a pair of electrical circuits connected to said valve actuating means, a reversing switch actuated by said flow meter for connecting said source alternately first to one and then to the other of said circuits, a second reversing switch operated concurrently with said valve actuating device for opening the closed circuits at predetermined intervals after they are closed by said first reversing switch, and means for actuating said second reversing switch comprising an electric motor connected in parallel to said valve actuating device and a driving connection between said motor and said second reversing switch.

7. An automatic sampling device for use in obtaining samples of a fluid flowing through a pipe line at intervals the frequency of which vary in accordance with the flow rate through said pipe line, comprising a sample draw-off line connected to said pipe line, a valve in said draw-off line, a solenoid for actuating said valve, a flow meter responsive to the flow through said pipe line, a source of electricity, a pair of electrical circuits connected to said solenoid, a reversing switch actuated intermittently by said flow meter for connecting said source alternately first to one and then to the other of said circuits and a secondary timing device for opening the closed circuits at predetermined intervals after they are closed by said reversing switch, said secondary timing device being connected electrically in parallel with said solenoid so as to be actuated concurrently therewith.

GEORGE C. FAIRBAIRN.

REFERENCES CITED

The following references are of record in the file of this patent:

UNITED STATES PATENTS

| Number | Name | Date |
|---|---|---|
| 1,649,399 | Gard | Nov. 15, 1927 |
| 2,183,338 | Slough | Dec. 12, 1939 |
| 2,245,679 | Kelley | June 17, 1941 |
| 2,418,876 | Grace, Jr. | Apr. 15, 1947 |